Patented Mar. 19, 1935

1,994,542

UNITED STATES PATENT OFFICE 1,994,542

BITUMINOUS EMULSION AND METHOD OF PRODUCING THE SAME

Preston R. Smith, Rahway, and Orin R. Douthett, Perth Amboy, N. J., assignors to The Barber Asphalt Company, Philadelphia, Pa., a corporation of West Virginia No Drawing. Application July 26, 1928, Serial No. 295,613

21 Claims. (Cl. 134—1)

Our invention relates to an improved method for the production of bituminous emulsions and more particularly to the production of emulsions having a high degree of stability.

Heretofore it has been known to emulsify bituminous substances, such as natural and artificial asphalt and asphaltic products, pitches, tars and tar-like substances, resins, petroleum and derivatives thereof, for use as binders, adhesives, coating compositions and for impregnating and surfacing. Such emulsions have heretofore been generally made by emulsifying the desired bitumen in a heated condition with a dispersing medium, as an aqueous solution of a soap, a saponacious material, a protein, a polysaccharide, a hemicellulose, a gum, a tannin, a sulfonated oil, an alkali, an alkali salt, etc.

Emulsions have heretofore been produced by various methods as, for example, by violently agitating heated bituminous material with a dispersing agent in aqueous solution, and by mixing a dispersing agent in a relatively dry state with bituminous material heated above the boiling point of water and adding water, which on contact with the heated bituminous material will boil off rapidly with evolution of steam and agitation of the mass to an extent sufficient to produce the emulsion. Another method involves dissolving the bituminous material in a volatile solvent and agitating the solution with a hot, aqueous dispersing medium, the heat of which rapidly drives off the volatile solvent with agitation sufficient to form the emulsion. Still another method involves intimately mixing bituminous material and a more or less dry dispersing medium and adding the mixture to water with agitation.

The bituminous emulsions produced by methods heretofore known have proved substantially satisfactory, but they are open to serious objection, in that they do not possess desired stability and it is the object of our invention to provide a method for the production of bituminous emulsions which will have great stability as compared with that of such emulsions as heretofore produced.

In the production of a bituminous emulsion, it is recognized that, other conditions remaining constant, the stability of the emulsion will be directly related to the size of the particle of the dispersed phase, or in other words, the smaller the particle in the dispersed phase, the more stable the emulsion, and it has been the common aim of all methods for producing bituminous emulsions, heretofore known, to produce an emulsion in which the particle size of the dispersed phase is as small as possible consistent with an economic use of power.

Now in accordance with our invention, we provide a method for the production of bituminous emulsions wherein the bituminous material will be in an extremely fine state of dispersion and the emulsions will accordingly be of great stability.

The method in accordance with our invention involves essentially the production of a bituminous emulsion in a dispersing medium of an alkalinity at, or just below, the highest alkalinity with which an oil-in-water emulsion will be produced, followed by reduction of the alkalinity substantially below the critical alkalinity, as for example, by dilution of the emulsion with water, it having been discovered by us that if a bitumen be emulsified in a dispersing medium of the highest, or just below the highest, degree of alkalinity with which an oil-in-water type emulsion is produced and the alkalinity be then reduced, the globules, or particles, of the dispersed phase do no coalesce but will retain their small size and the emulsion will be extremely stable.

In the course of an extended investigation of bituminous emulsions in connection with the effect of varying of the alkalinity of the dispersing medium, or continuous phase, upon the particle size of the dispersed phase, we have determined that with an increasingly alkaline dispersion medium, the size of the particles of the dispersed phase decreases until finally above a definite alkalinity, emulsions of the water-in-oil type are produced. By way of illustration, the following table shows the effect of increasing the alkalinity of the dispersing medium in emulsions containing, for example, 70.0% Trinidad oil asphalt, having a penetration of about 190 according to the A. S. T. M. method, and an aqueous solution of sodium hydroxide of varying alkalinity as the dispersing medium, the emulsification being effected by agitating together the asphalt, in a heated condition, and the sodium hydroxide solution.

| Sodium hydroxide solution used as dispersing medium | Type of emulsion | Relative size of dispersed globules |
|---|---|---|
| 0.01 M | No stable emulsion | |
| 0.03 M | Oil-in-water | Very coarse, (almost macroscopic). |
| 0.10 M | Oil-in-water | Moderately small, (emulsion creams badly). |
| 0.20 M | Oil-in-water | Very small, (emulsion relatively stable). |
| 0.25 M | Oil-in-water when first made but inverting to water-in-oil type after being kept some time. | Extremely small, (nearly all exhibit Brownian movement). |
| 0.30 M | Water-in-oil type | |

The figures in the above table are applicable only in the case of emulsions made with the particular asphalt described and by the method given; however, the figures are general in that a similar series of emulsions can be prepared from other bitumens when sodium hydroxide is used as the dispersing medium. A similar qualitative relationship between particle size of the dispersed phase and degree of alkalinity of the dispersing medium will be noted when sodium hydroxide is replaced by other alkali or alkaline salt; further, where the dispersing medium includes a soap, or other protective colloid, a parallel relationship between the degree of alkalinity and the particle size can be shown.

While emulsions of the water-in-oil type as compared with the oil-in-water type will be formed at a certain definite alkalinity, the exact alkalinity at which inversion will take place will vary somewhat with different emulsifiers. Generally speaking, however, the following table will be characteristic without reference to any particular emulsifier:

| Alkalinity | Kind of emulsion | Particle size |
| --- | --- | --- |
| Below 7.0 | No emulsion | |
| 7.0–9.0 | Oil-in-water | Very coarse (almost macroscopic). |
| 9.0–12.0 | Oil-in-water | Moderately small. |
| 12.0–13.0 | Oil-in-water | Very small. |
| 13.0 | Oil-in-water | Extremely small. |
| Above 13.0 | Water-in-oil | |

It now follows that a bituminous emulsion made with the dispersing medium at, or just below, the highest alkalinity that will give an oil-in-water type of emulsion, which we will define as the critical alkalinity, will have an extremely small particle size. The emulsion so formed will be relatively unstable in that it may invert to a water-in-oil type, or, simply separate, for example, in storage. If the alkalinity of the dispersing medium of such an emulsion is reduced substantially below the critical alkalinity, for example, by dilution of the emulsion with water, the resulting emulsion will be extremely stable and the extremely fine state of dispersion of the bitumen will be retained.

As illustrative of the practical application of the method in accordance with our invention, an initial aqueous dispersing medium may be prepared by heating together rosin, 20 parts (more or less, by weight), sodium hydroxide 6 parts (more or less, by weight), and water, 375 parts (more or less, by weight), until the solution is complete. The solution will have an excess of alkali over that necessary to combine with the rosin to form a soap acting as a protective agent in the emulsion to be formed. The alkalinity of the solution will be found to be about pH 13.0–13.1 and to be slightly less alkaline than the critical alkalinity as defined in the illustration given where the pH value 13.1+ a water-in-oil emulsion would have been formed.

The solution, as described above, in the amount of 16 parts (more or less, by weight) may then be emulsified with 105 parts (more or less, by weight) of asphalt in a heated condition in any desired manner, as, for example, by agitation. The initial emulsion will contain only about 12.0%, by weight, of water and will be very viscous. The particles of the dispersed asphalt will, however, be extremely small. To the initial emulsion may then be added, with agitation, 32 parts (more or less, by weight) of water, which will give the final emulsion containing about 30.0%, by weight, of water and which will be extremely stable with extremely fine particles in the dispersed phase.

In connection with the above illustration, it may be noted that if the finally added water were included in the initial dispersing medium that the solution would have an alkalinity of about pH 12.5 and would produce an emulsion having a larger particle size than the emulsion produced as described; and it may be further noted that if the alkalinity of the initial dispersing medium were greater than the critical alkalinity, then the initial emulsion would be of the water-in-oil type and on the addition of water it would be difficult, or impossible, to cause the emulsion to invert and give the desirable oil-in-water type.

As a further illustration of the practical application of the method in accordance with our invention, the initial dispersing medium may be prepared by taking 0.47 pound ordinary yellow bar laundry soap, 0.94 pound 75.0% Turkey red oil and 0.235 pound sodium hydroxide and dissolving them in 15 pounds hot water. Into this hot solution, 105 pounds melted asphalt are run and the mixture vigorously agitated. To the initial emulsion is then added 32 pounds of water. The emulsion so produced will have a much finer particle size than if the emulsion were first made in a dispersing medium containing all of the water, and will be highly stable.

It will be understood that we do not intend that our invention shall be limited to the use of any particular emulsifying agent, as any material may be used that will stabilize the emulsion when in the alkaline condition, nor to the use of any particular proportions of protective colloid, bitumen, or water, as such may be varied within wide limits; and it will be understood that after the production of the initial emulsion any desired quantity of water may be added without materially affecting the particle size of the dispersed material.

Having now fully described our invention, what we claim and desire to protect by Letters Patent is:

1. The method of producing a bituminous emulsion which includes emulsifying asphalt and an aqueous dispersing medium of an alkalinity of about pH 13.0 and reducing the alkalinity of the emulsion formed.

2. The method of producing a bituminous emulsion which includes emulsifying asphalt and an aqueous dispersing medium of an alkalinity of about pH 13.0 and adding water to the emulsion formed.

3. The method of producing a bituminous emulsion which includes emulsifying asphalt and an aqueous alkaline solution, the alkalinity of the solution being about pH 13.0, and reducing the alkalinity of the emulsion formed.

4. The method of producing a bituminous emulsion which includes emulsifying asphalt and a dispersing medium consisting of an aqueous alkaline solution containing a protective colloid, the alkalinity of the solution being about pH 13.0, and adding water to the emulsion formed.

5. The method of producing a bituminous emulsion which includes emulsifying a bitumen and an alkaline solution of a protective colloid to form an emulsion of the oil-in-water type, the solution having an alkalinity approximating but less than the critical alkalinity above which an oil-in-water type emulsion would not be formed using the same constituents, and reducing the alkalinity of the emulsion formed.

6. The method of producing a bituminous emulsion which includes emulsifying a bitumen and an alkaline solution of a protective colloid to form an emulsion of the oil-in-water type, the solution having an alkalinity approximating but less than the critical alkalinity above which an oil-in-water type emulsion would not be formed using the same constituents, and adding water to the emulsion formed.

7. The method of producing a bituminous emulsion which includes emulsifying a bitumen and an aqueous dispersing medium having an alkalinity approximating but less than the critical alkalinity above which an oil-in-water type emulsion would not be formed using the same constituents, and reducing the alkalinity of the emulsion formed.

8. The method of producing a bituminous emulsion which includes emulsifying a bitumen and an aqueous dispersing medium to form an emulsion of the oil-in-water type, the dispersing medium having an alkalinity approximating but less than the critical alkalinity above which an oil-in-water type emulsion would not be formed using the same constituents, and adding water to the emulsion formed.

9. The method of producing a bituminous emulsion which includes emulsifying a bitumen and an aqueous dispersing medium including a protective colloid and an alkali to form an emulsion of the oil-in-water type, the dispersing medium having an alkalinity approximating but less than the critical alkalinity above which an oil-in-water type emulsion would not be formed using the same constituents, and reducing the alkalinity of the emulsion formed.

10. The method of producing a bituminous emulsion which includes emulsifying a bitumen and an aqueous dispersing medium including a protective colloid and an alkali to form an emulsion of the oil-in-water type, the dispersing medium having an alkalinity approximating but less than the critical alkalinity above which an oil-in-water type emulsion would not be formed using the same constituents, and adding water to the emulsion formed.

11. A bituminous emulsion of the oil-in-water type including a bitumen dispersed in fine particles in an aqueous dispersing medium and characterized by the fact that the dispersing medium has an alkalinity of about pH 13.0.

12. A bituminous emulsion of the oil-in-water type including asphalt dispersed in fine particles in an aqueous dispersing medium and characterized by the fact that the dispersing medium has an alkalinity of about pH 13.0.

13. A bituminous emulsion of the oil-in-water type including a bitumen dispersed in fine particles in an aqueous dispersing medium containing a protective colloid and characterized by the fact that the dispersing medium has an alkalinity of about pH 13.0.

14. A bituminous emulsion of the oil-in-water type including asphalt dispersed in fine particles in an aqueous dispersing medium containing a protective colloid and characterized by the fact that the dispersing medium has an alkalinity of about pH 13.0.

15. A bituminous emulsion of the oil-in-water type including a bitumen dispersed in fine particles in an aqueous dispersing medium, characterized by the fact that the dispersing medium has an alkalinity approximating but less than the critical alkalinity above which a water-in-oil type emulsion would be formed using the same constituents.

16. A bituminous emulsion of the oil-in-water type including asphalt dispersed in fine particles in an aqueous dispersing medium, characterized by the fact that the dispersing medium has an alkalinity approximating but less than the critical alkalinity above which a water-in-oil type emulsion would be formed using the same constituents.

17. A bituminous emulsion of the oil-in-water type including a bitumen dispersed in fine particles in an aqueous dispersing medium containing a protective colloid, characterized by the fact that the dispersing medium has an alkalinity approximating but less than the critical alkalinity above which a water-in-oil type emulsion would be formed using the same constituents.

18. A bituminous emulsion of the oil-in-water type including asphalt dispersed in fine particles in an aqueous dispersing medium containing a protective colloid, characterized by the fact that the dispersing medium has an alkalinity approximating but less than the critical alkalinity above which a water-in-oil type emulsion would be formed using the same constituents.

19. A bituminous emulsion of the oil-in-water type including a bitumen dispersed in fine particles in an aqueous dispersing medium and added water, the emulsion being characterized by the fact that the alkalinity of the dispersing medium plus the added water is equivalent to an alkalinity for the aqueous dispersing medium without the added water or an alkalinity approximating but less than the critical alkalinity above which a water-in-oil emulsion would be formed using the same constituents.

20. The method of producing a bituminous emulsion, which includes emulsifying a bitumen and an aqueous dispersing medium having an alkalinity approximating but less than the critical alkalinity above which an oil-in-water type emulsion will not be formed using the same constituents and reducing the alkalinity of the emulsion formed to an alkalinity equivalent to an alkalinity for the aqueous dispersing medium before emulsification of about 0.5 pH units below that of the alkalinity of the original dispersing medium.

21. The method of producing a bituminous emulsion, which includes emulsifying asphalt and an aqueous dispersing medium comprising an alkaline solution of a protective colloid having an alkalinity approximating but less than the critical alkalinity above which an oil-in-water type emulsion will not be formed using the same constituents and reducing the alkalinity of the emulsion formed to an alkalinity equivalent to an alkalinity for the aqueous dispersing medium before emulsification of about 0.5 pH units below that of the alkalinity of the original dispersing medium.

PRESTON R. SMITH.
ORIN R. DOUTHETT.